(12) United States Patent
Hsiao

(10) Patent No.: US 7,330,235 B2
(45) Date of Patent: *Feb. 12, 2008

(54) LIQUID CRYSTAL DISPLAY PANEL HAVING SPACERS WEDGED IN THREE-LAYERED CONDUCTIVE LINES AND MANUFACTURING METHOD THEREOF

(75) Inventor: Kuan-Cheng Hsiao, Wugu Township, Taipei County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 6 days.

This patent is subject to a terminal disclaimer.

(21) Appl. No.: 11/270,248

(22) Filed: Nov. 8, 2005

(65) Prior Publication Data

US 2007/0103636 A1 May 10, 2007

(51) Int. Cl.
*G02F 1/1339* (2006.01)
(52) U.S. Cl. .................. 349/155; 349/147; 349/156
(58) Field of Classification Search ......... 349/155–157
See application file for complete search history.

(56) References Cited

U.S. PATENT DOCUMENTS

| | | | | |
|---|---|---|---|---|
| 5,153,754 A | * | 10/1992 | Whetten | ............ 349/147 |
| 6,667,790 B2 | * | 12/2003 | Yanagawa et al. | .......... 349/139 |
| 6,690,445 B2 | * | 2/2004 | Matsumoto | ............... 349/155 |
| 7,068,342 B1 | * | 6/2006 | Lee | .......................... 349/155 |
| 2003/0071956 A1 | * | 4/2003 | Sasaki et al. | ............. 349/155 |
| 2004/0114087 A1 | * | 6/2004 | Cho et al. | ................. 349/155 |
| 2004/0189928 A1 | * | 9/2004 | Yang et al. | ................. 349/155 |
| 2005/0041194 A1 | | 2/2005 | Lee et al. | |

\* cited by examiner

*Primary Examiner*—Andrew Schechter
*Assistant Examiner*—Matthew Tynan
(74) *Attorney, Agent, or Firm*—J.C. Patents

(57) ABSTRACT

A liquid crystal display panel including a first substrate, a second substrate and a liquid crystal layer is provided. The first substrate has a plurality of scan lines, data lines and thin film transistors thereon, and the thin film transistors are driven by the scan lines and data lines. In particular, a plurality of patterned openings are formed in at least one of the scan lines and data lines. The second substrate having a plurality of photo spacers thereon is disposed above the first substrate, and the photo spacers are wedged in the patterned openings. The liquid crystal layer is disposed between the first substrate and second substrate. Because the photo spacers are wedged in the patterned openings, the cell gap between the first and second substrates can be kept uniformly.

17 Claims, 4 Drawing Sheets

LIQUID CRYSTAL DISPLAY PANEL HAVING SPACERS WEDGED IN THREE-LAYERED CONDUCTIVE LINES AND MANUFACTURING METHOD THEREOF

BACKGROUND OF THE INVENTION

1. Field of the Invention

The present invention relates to a display panel and manufacturing process thereof. More particularly, the present invention relates to a photo spacer in a liquid crystal display panel (LCD panel) and manufacturing process thereof.

2. Description of Related Art

In recent years, with the highly advancing of optoelectronics and semiconductor technology, the planar display apparatuses are developed rapidly. Among several types of planar display apparatuses, a liquid crystal display apparatus is widely utilized due to their advantages such as higher display quality, higher space utilization, lower power consumption and lower radiation. The liquid crystal display apparatus traditionally comprises a liquid crystal display panel (LCD panel) and a backlight module, wherein the backlight module can provide the LCD panel with a light source.

FIGS. 1A and 1B are cross-sectional views of a conventional LCD panel. Referring to FIGS. 1A and 1B, the conventional LCD panel 100 is made of a color filter (CF) substrate 10, an active device matrix substrate 120 and a liquid crystal layer 130 disposed between the two substrates 110 and 120, wherein a color filter array layer (not shown) is disposed on the CF substrate 110 to display full colors for the LCD panel 100. A plurality of scan lines (not shown), data lines (not shown) and TFT transistors (not shown) are disposed on the active device matrix substrate 120, wherein the active device matrix substrate 120 is divided into a plurality of pixel areas (not shown) via the scan lines and the data lines. The TFT transistors are disposed in the pixel areas and are driven by the scan lines and the data lines.

It should be noted that a uniform cell gap d between the CF substrate 110 and the active device matrix substrate 120 is desired to show better display quality of the LCD panel 100. Traditionally, a plurality of photo spacers 140a or ball-type beads 140b are disposed between the two substrates 110 and 120 to keep a uniform cell gap d between the two substrates 110 and 120.

Referring to FIGS. 1A and 1B, the two substrates 110 and 120 are assembled by bonding process. During the bonding process, the photo spacers 140a or the ball-type beads 140b are pressed to be shrunk. Once the outside atmospheric pressure is lowered, the photo spacers 140a or the ball-type beads 140b expand rapidly, such that the cell gap d between the two substrates 110 and 120 increases. When the cell gap d between the two substrates 110 and 120 increases, gas will enter a space between the two substrates 110 and 120 and a plurality of bubbles occur between the two substrates 110 and 120. The bubbles occurred between the two substrates 110 and 120 deteriorates the display quality of the LCD panel 100.

SUMMARY OF THE INVENTION

Accordingly, the present invention is directed to a LCD panel capable of reducing the adverse effect, i.e. the gas bubbles generated in the space between the two substrates, so as to have better display quality.

The present invention is also directed to a manufacturing process of a LCD panel capable of reducing the adverse effect, i.e. the gas bubbles generated in the space, so as to have better display quality for the LCD panel.

According to an embodiment of the present invention, a LCD panel is disclosed. It comprises a first substrate, a second substrate and a liquid crystal layer. The first substrate has a plurality of scan lines, data lines and thin film transistors which are disposed thereon, wherein the thin film transistors are driven by the scan lines and the data lines, and at least one of the scan lines and the data lines has a plurality of patterned openings. The second substrate is disposed above the first substrate, wherein a plurality of photo spacers are disposed on the second substrate and the photo spacers are wedged in the patterned openings. The liquid crystal layer is disposed between the first substrate and the second substrate.

According to an embodiment of the present invention, the scan lines and the data lines have the patterned openings respectively, and the heights of the photo spacers wedged in the patterned openings of the scan lines are different from the heights of those of the data lines.

According to an embodiment of the present invention, wherein each of the scan lines and each of the data lines respectively comprises a first conductive layer, a second conductive layer and a third conductive layer, wherein the first conductive layer has a first opening. The second conductive layer is disposed on the first conductive layer, wherein the second conductive layer has a second opening and the second opening is smaller than the first opening. The third conductive layer is disposed on the second conductive layer, wherein the third conductive layer has a third opening and the third opening is larger than the second opening, and wherein each of the patterned openings comprises the first opening, the second opening and the third opening.

According to an embodiment of the present invention, wherein a size of an upper portion of the second opening is larger than a size of a lower portion of the second opening.

According to an embodiment of the present invention, wherein an etching rate of the first conductive layer and the third conductive layer is larger than an etching rate of the second conductive layer. A material of the first conductive layer and the third conductive layer comprises Al, and a material of the second conductive layer comprises Ti.

According to an embodiment of the present invention, wherein each of the photo spacers comprises a top portion and a body, and a size of the top portion is larger than a size of the body.

According to an embodiment of the present invention, further comprising a color filter array layer and the color filter array layer is disposed on the first substrate or on the second substrate.

According to an embodiment of the present invention, wherein the first substrate comprises an active device matrix substrate.

According to an embodiment of the present invention, wherein the second substrate comprises a color filter substrate.

According to an embodiment of the present invention, a process for manufacturing a liquid crystal display panel is disclosed. It includes the following steps. First, a first substrate is provided, wherein the first substrate has a plurality of scan lines, data lines and thin film transistors formed thereon. The thin film transistors are driven by the scan lines and the data lines. At least one of the scan lines and the data lines has a plurality of patterned openings formed therein. Next, a second substrate is provided, wherein the second substrate has a plurality of photo spacers and the second substrate is disposed above the first substrate. And then, the first substrate and the second substrate are assembled, wherein the photo spacers are wedged in the patterned openings. Afterwards, a liquid crystal layer is filled between the first substrate and the second substrate.

According to an embodiment of the present invention, wherein a process for forming the scan lines or the data lines includes the following steps. First, a first conductive layer, a second conductive layer and a third conductive layer are formed over the first substrate sequentially. Next, a patterned photo-resist layer is formed on the third conductive layer. And then, etching the third conductive layer, the second conductive layer and the first conductive layer sequentially to define the scan lines or the data lines, in the meantime, a first opening is formed in the first conductive layer, a second opening is formed in the second conductive layer and a third opening is formed in the third conductive layer. Wherein the second opening is smaller than the first opening and the third opening, and each of the patterned openings comprises the first opening, the second opening and the third opening.

According to an embodiment of the present invention, a size of an upper portion of the second opening is larger than a size of a lower portion of the second opening.

According to an embodiment of the present invention, an etching rate of the first conductive layer and the third conductive layer is larger than an etching rate of the second conductive layer. A material of the first conductive layer and the third conductive layer comprises Al, and a material of the second conductive layer comprises Ti.

According to an embodiment of the present invention, each of the photo spacers comprises a top portion and a body, and a size of the top portion is larger than a size of the body.

According to an embodiment of the present invention, the method for manufacturing the LCD panel further comprises a step of forming a color filter array layer on the first substrate or on the second substrate.

To sum up, in the present invention, the LCD panel and a manufacturing process thereof, the patterned openings are formed in the scan lines and/or the data lines of the first substrate, the photo spacers are formed on the second substrate, and the photo spacers can be wedged in the patterned openings. Therefore, even if the photo spacers are swollen rapidly due to the lower atmospheric pressure, a uniform cell gap between the two substrates can be still kept. Then the outside gas will not enter a space between the two substrates so the display quality of the LCD panel can be kept in good condition.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Various specific embodiments of the present invention are disclosed below, illustrating examples of various possible implementations of the concepts of the present invention. The following description is made for the purpose of illustrating the general principles of the invention and should not be taken in a limiting sense. The scope of the invention is best determined by reference to the appended claims.

Figure 1A:
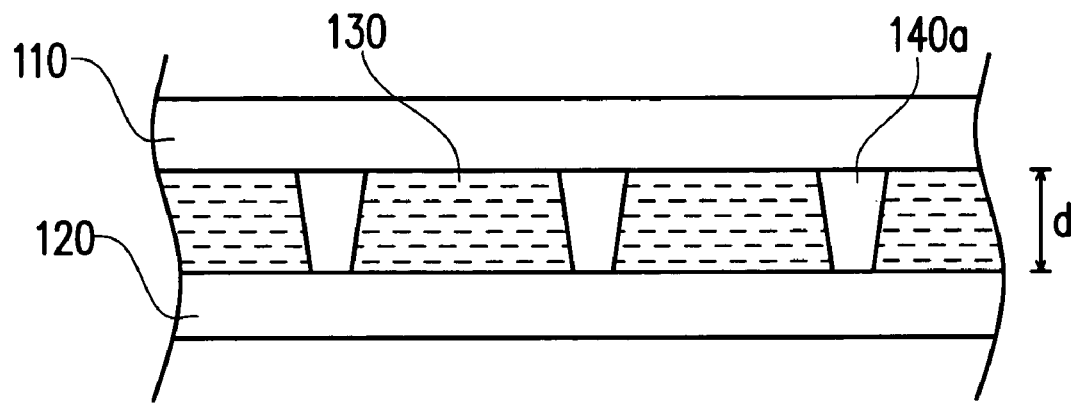
FIGS. 1A and 1B are cross-sectional views of a conventional LCD panel.
Figure 1B:
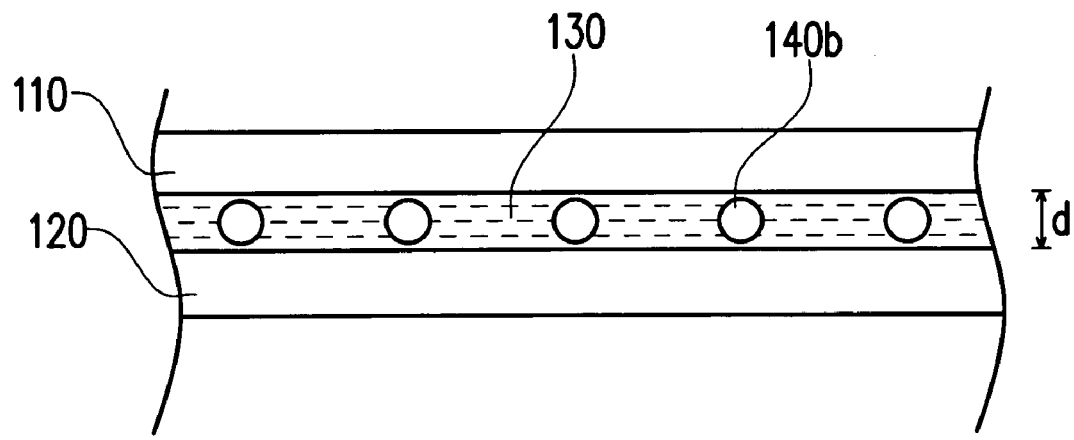
Figure 2:
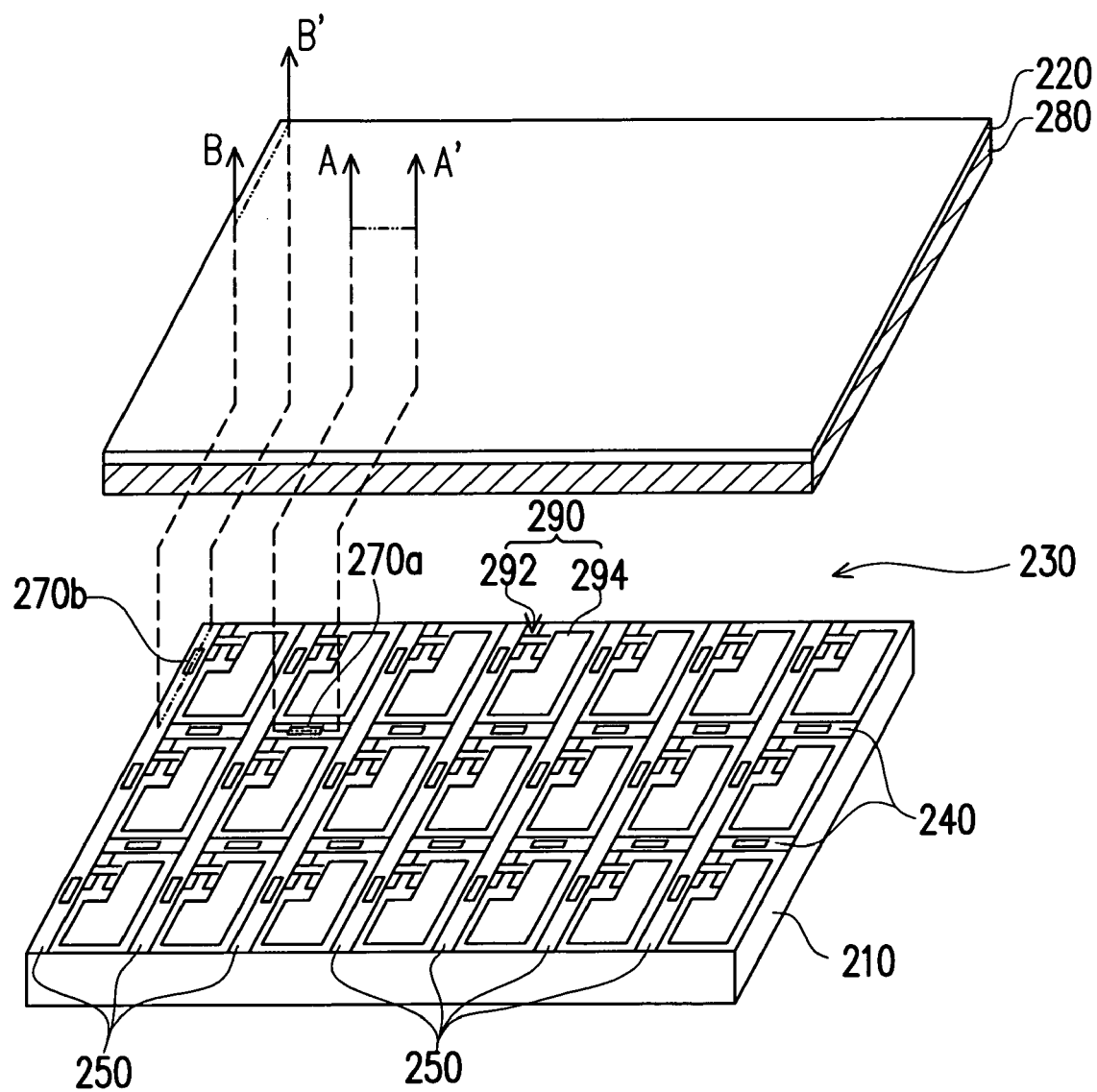
FIG. 2 is a perspective view of a LCD panel according to one embodiment of the present invention.
Figure 3A:
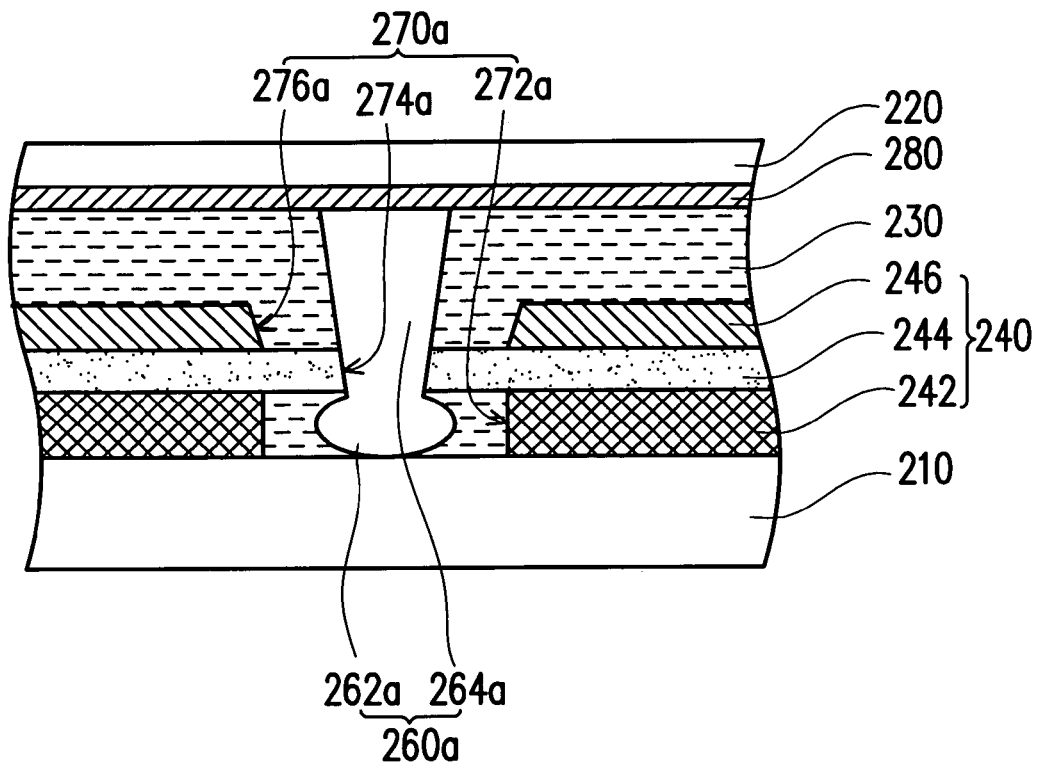
FIG. 3A is a cross-sectional view taken along A-A' line of FIG. 2.
Figure 3B:
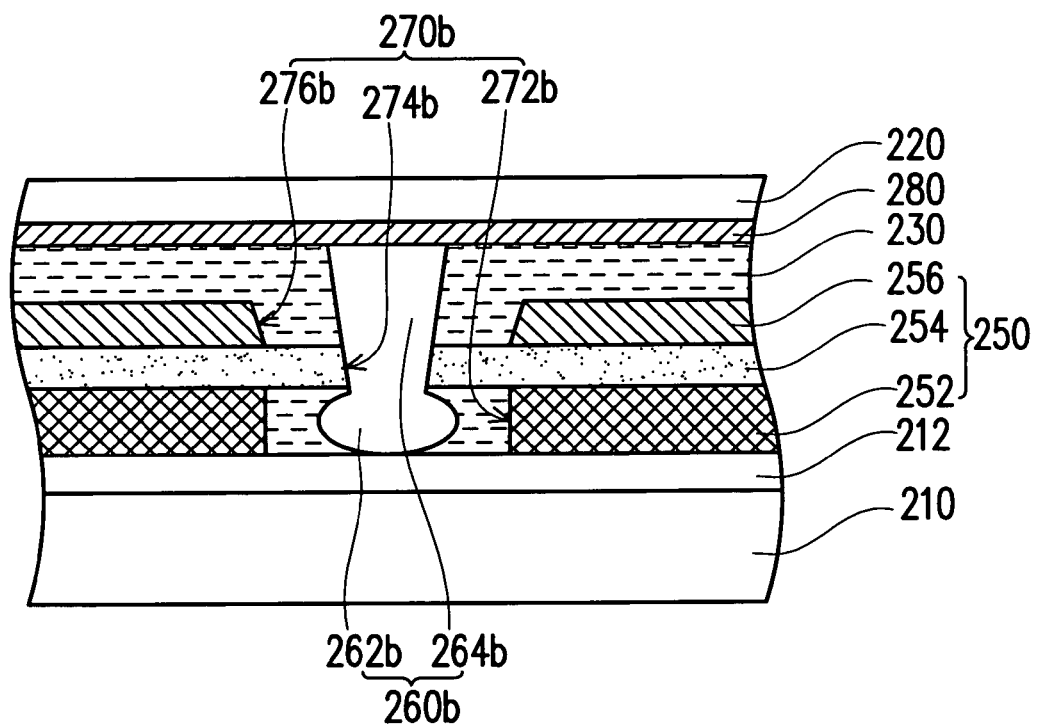
FIG. 3B is a cross-sectional view taken along B-B' line of FIG. 2.

FIG. 2 is a perspective view of a LCD panel according to one embodiment of the present invention. FIG. 3A is a cross-sectional view taken along A-A' line of FIG. 2. FIG. 3B is a cross-sectional view taken along B-B' line of FIG. 2. Referring to FIGS. 2, 3A and 3B, the LCD panel 200 includes a first substrate 210, a second substrate 220 and a liquid crystal layer 230. A plurality of scan lines 240, data lines 250 and thin film transistors 292 are disposed on the first substrate 210. The thin film transistors 292 are driven by the scan lines 240 and the data lines 250, and at least one of the scan lines 240 and the data lines 250 has a plurality of patterned openings 270a/270b. The second substrate 220 is disposed above the first substrate 210. A plurality of photo spacers 260a and 260b (shown in FIGS. 3A and 3B) are disposed on the second substrate 220, wherein the photo spacers 260a and 260b are wedged in the patterned openings 270a and 270b respectively. The liquid crystal layer 230 is disposed between the first substrate 210 and the second substrate 220. Furthermore, a plurality of pixel electrodes 294 are disposed on the first substrate 210, wherein a pixel unit 290 includes one of the pixel electrodes 294 and one of the corresponding transistors 292.

It should be noted that the scan lines 240 and the data lines 250 are the structures having multi-layers in one embodiment of the present invention. More specifically, each of the scan lines 240 includes a first conductive layer 242, a second conductive layer 244 and a third conductive layer 246, and each of the data lines 250 includes a first conductive layer 252, a second conductive layer 254 and a third conductive layer 256. Particularly, during the etching process for forming the scan lines 240 or the data lines 250, the patterned openings 270a and 270b can be formed in at least one of the scan lines 240 and the data lines 250 at the same time. In other words, the patterned openings 270a can be simply formed in the scan lines 240 or the patterned openings 270b can be only formed in the scan lines 250 or the patterned openings 270a and 270b can be both formed in the scan lines 240 and the data lines 250 respectively.

Referring to FIGS. 3A and 3B, the first conductive layer 242/252 has a first opening 272a/272b. The second conductive layer 244/254 is disposed on the first conductive layer 242/252, wherein the second conductive layer 244/254 has a second opening 274a/274b and the second opening 274a/274b is smaller than the first opening 272a/272b. The third conductive layer 246/256 is disposed on the second conductive layer 244/254, wherein the third conductive layer 246/256 has a third opening 276a/276b and the third opening 276a/276b is larger than the second opening 274a/274b. Each of the patterned openings 270a comprises the first opening 272a, the second opening 274a and the third opening 276a, and each of the patterned openings 270b comprises the first opening 272b, the second opening 274b and the third opening 276b. In one embodiment, it should be noted that a size of an upper portion of the second opening 274a/274b is larger than a size of a lower portion of the second opening 274a/274b, wherein a shape of the second opening 274a/274b can be such as an inverted trapezoid.

Additionally, the determinant of materials of the first conductive layer 242/252, the second conductive layer 244/254 and the third conductive layer 246/256 is according to that an etching rate of the first conductive layer 242/252 and the third conductive layer 246/256 is larger than an etching rate of the second conductive layer 244/254. In one embodiment, a material of the first conductive layer 242/252 and the third conductive layer 246/256 is Al, and a material of the second conductive layer 244/254 is Ti. Undoubtedly, a material of the first conductive layer 242/252 and the third conductive layer 246/256 can be MoNb alloy, Cr or Mo, and a material of the second conductive layer 244/254 can be AlNd alloy or Al, as long as the etching rate of the first conductive layer 242/252 and the third conductive layer 246/256 is larger than the etching rate of the second conductive layer 244/254.

Referring to FIGS. 3A and 3B, each of the photo spacers 260a/260b comprises a top portion 262a/262b and a body 264a/264b, and a size of the top portion 262a/262b is larger than a size of the body 264a/264b. A material of the photo spacers 260a/260b is such as a photo-resist material. In addition, the method for forming the particular shaped-photo spacers is that adjusting the exposure amount or using specific photo-resist materials.

Because the scan lines 240 and/or the data lines 250 on the first substrate 210 have the patterned openings 270a and/or 270b, and the photo spacers 260a and/or 260b are formed on the second substrate 220, the photo spacers 260a and/or 260b can be wedged in the patterned openings 270a and/or 270b so that the first substrate 210 and the second substrate 220 can be assembled well with each other thereby. The assembling mechanism is illustrated as followings. Referring to FIGS. 3A and 3B, when the first substrate 210 and the second substrate 220 are pressed first, the photo spacers 260a/260b will slide into the third opening 276a/276b for initially positioning the photo spacers 260a/260b. Next, the first substrate 210 and the second substrate 220 are pressed continuously. Because the shape of the second opening 274a/274b is an inverted trapezoid (i.e. the upper portion of the second opening 274a/274b is wider than the lower portion of the second opening 274a/274b), and a material of the photo spacers 260a/260b is an elastic photo-resist material, a top portion 262a/262b of each photo spacer 260a/260b can be wedged in the second opening 274a/274b and then entered the first opening 272a/272b. Noticeably, because the lower portion of the second opening 274a/274b is narrower than the upper portion of the second opening 274a/274b, after the top portion 262a/262b entered the first opening 272a/272b, the top portion 262a/262b can not be easily detached from the patterned opening 270a/270b. While the outside atmospheric pressure is reduced, the photo spacer 260a/260b is swollen due to the lower pressure and the photo spacer 260a/260b is still wedged in the patterned opening 270a/270b, so as to keep the cell gap between the two substrates 210 and 220 in a uniform width. That is, the adverse effect that the cell gap between the two substrates 210 and 220 is expanded to generate the gas bulbs between the two substrates 210 and 220 will be reduced, so the display quality of the LCD panel 200 will be kept in good condition.

Additionally, if the scan lines 240 and the data lines 250 have the patterned openings 270a and 270b respectively, the heights of the photo spacers 260a wedged in the patterned openings 270a of the scan lines 240 are different from the heights of the photo spacers 260b wedged in the patterned openings 270b. Referring to FIGS. 3A and 3B, the heights of the photo spacers 260a and 260b are so different because the scan lines 240 are located on the first substrate 210, a device layer 212 covers the scan lines 240, and the data lines 250 are formed on the device layer 212. In other words, the heights of the photo spacers 260a wedged in the patterned openings 270a of the scan lines 240 are higher, contrarily, the heights of the photo spacers 260b wedged in the patterned openings 270b of the data lines 250 are shorter.

Referring to FIGS. 2, 3A or 3B, in one embodiment, the LCD panel 200 further comprises a color filter array layer 280, disposed on the first substrate 210 or on the second substrate 220. When the color filter array layer 280 is disposed on the second substrate 220, the second substrate 220 is a color filter substrate (CF substrate) and the first substrate 210 is a thin film transistor substrate (TFT substrate). When the color filter array layer 280 is disposed on the first substrate 210 (not shown), the first substrate 210 is a color filter on array (COA) substrate and the second substrate 220 is a glass substrate having common electrodes (not shown).

To sum up, the cell gap between the first substrate 210 and the second substrate 220 can be kept by utilizing the design that the photo spacers 260a and 260b wedged in the patterned openings 270a and 270b respectively. Therefore, if the outside atmospheric pressure is changed, the adverse effect, the outside gas enter a space between the two substrates due to the expanded cell gap, will be reduced. Furthermore, even if the LCD panel 200 is pressed with fingers, the little displacement of the two substrates 210 and 220 will occur, so as to reduce the light leakage of the LCD panel 200 due to pressing with fingers.

A process for manufacturing a liquid crystal display panel 200 in the present invention is also disclosed. It includes the following steps. First, a first substrate is provided. And a traditional manufacturing process of a pixel array is performed on the first substrate to form a plurality of conductive lines (such as scan lines and data lines), thin film transistors and pixel electrodes on the substrate. The traditional manufacturing process of the pixel array comprises the five-mask or the four-mask processes or any other traditional processes for manufacturing the pixel array. It should be noted that a plurality of patterned openings are formed in the conductive lines at the same time during an etching process is performed to form the conductive lines. That is shown in FIGS. 4A and 4B.

Figure 4A:
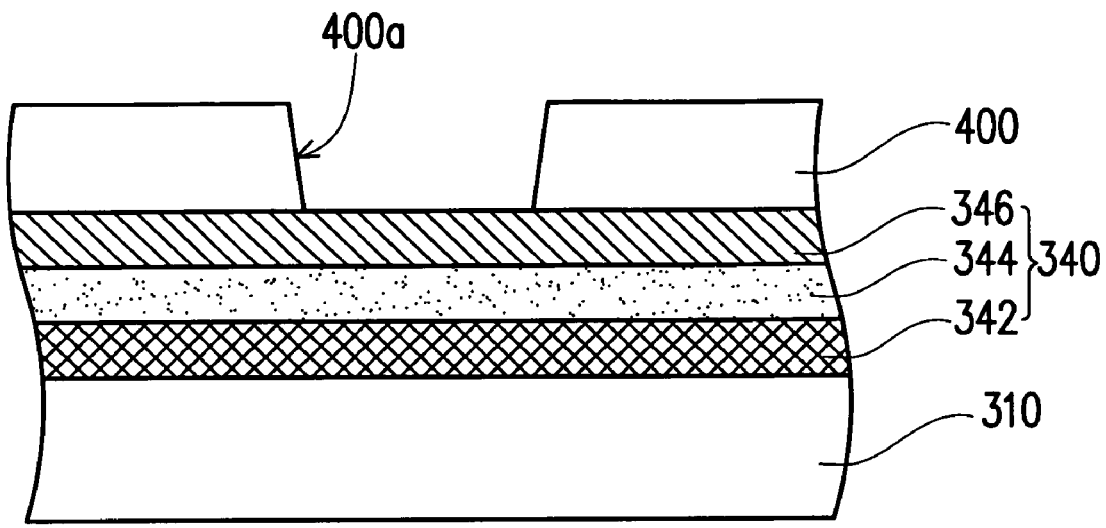
FIGS. 4A and 4B are a method for forming the lines according to the preferred embodiment of the present invention.
Figure 4B:
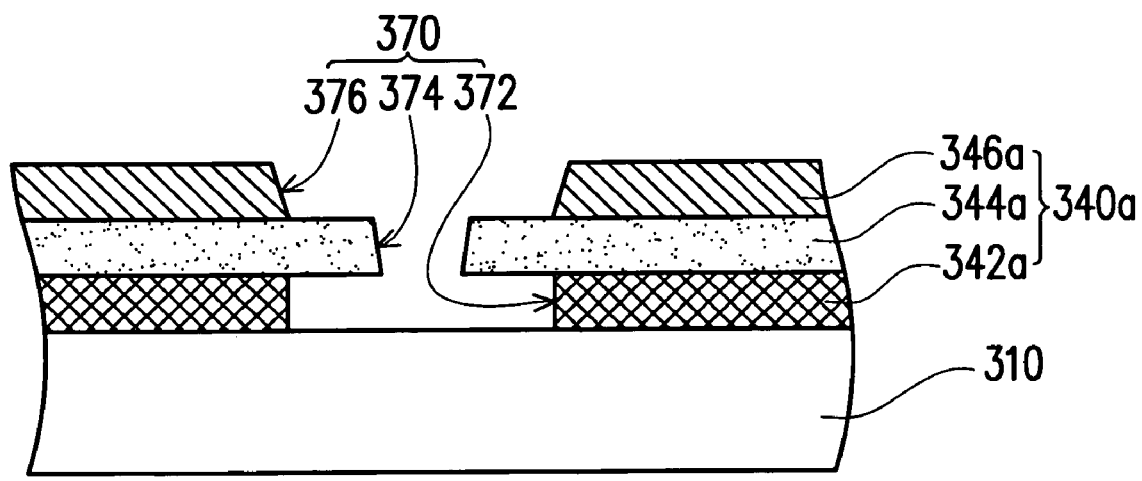

FIGS. 4A and 4B are a method for forming the conductive lines according to the preferred embodiment of the present invention.

First, referring to FIG. 4A, a first conductive layer 342, a second conductive layer 344 and a third conductive layer 346 are formed over a substrate 310 sequentially, wherein a conductive layer 340 is composed of the first conductive layer 342, the second conductive layer 344 and the third conductive layer 346. The method for forming the first conductive layer 342, the second conductive layer 344 and the third conductive layer 346 is a sputtering method, for example. And an etching rate of the first conductive layer 342 and the third conductive layer 346 is larger than an etching rate of the second conductive layer 344. In one embodiment, a material of the first conductive layer 342 and the third conductive layer 346 is Al and a material of the second conductive layer 344 is Ti. Certainly, a material of the first conductive layer 342 and the third conductive layer 346 can be MoNb alloy Cr or Mo, and a material of the second conductive layer 344 can be AlNd alloy or Al, as long as the etching rate of the first conductive layer 342 and the third conductive layer 346 is larger than the etching rate of the second conductive layer 344.

Referring to FIG. 4A, a patterned photo-resist layer 400 is then formed on the third conductive layer 346, wherein a method for forming the patterned photo-resist layer 400 is such as a general photolithography process. It should be noted that the patterned photo-resist layer 400 has an opening 400a, which exposes a portion of the third conductive layer 346. Wherein, the sidewall of the opening 400a is slanted, preferably.

Next, etching the third conductive layer 346, the second conductive layer 344 and the first conductive layer 342 sequentially to define a plurality of conductive lines 340a and patterned openings 370, i.e. a patterned first conductive layer 342a, a first opening 372, a patterned second conductive layer 344a, a second opening 374, a patterned third conductive layer 346a and a third opening 376 shown in FIG. 4B. Wherein each of the patterned openings 370 is composed of the first opening 372, the second opening 374 and the third opening 376.

It should be noted that the particular shapes of the patterned openings 370, i.e. the second opening 374 is smaller than the first opening 372 and the third opening 376, are formed during the etching process because an etching rate of the first conductive layer 342 and the third conductive layer 346 is larger than an etching rate of the second conductive layer 344. Especially, in one embodiment, a size of an upper portion of the second opening 374 is larger than a size of a lower portion of the second opening 374, wherein a shape of the second opening 374 is such as an inverted trapezoid.

The method for forming the conductive lines 340a shown in FIGS. 4A and 4B can also be utilized to form the scan lines 240 having patterned openings 270a and the data lines 250 having patterned openings 270b shown in FIG. 2. Afterwards, the manufacture of the first substrate 210 shown in FIGS. 2, 3A or 3B is complete after performing the five-mask or four-mask processes of the pixel array.

And then, a second substrate 220 shown in FIGS. 2, 3A or 3B is provided, wherein a plurality of photo spacers 260a and 260b has been formed on the second substrate 220 (shown in FIGS. 3A and 3B). The second substrate 220 is disposed above the first substrate 210. As for the photo spacers 260a and 260b, their shapes and manufacturing process has been disclosed in foregoing paragraphs and not repeated again.

Next, assembling the first substrate 210 and the second substrate 220, wherein the photo spacers 260a and 260b are wedged in the patterned openings 270a and 270b respectively. Then a space between the first substrate 210 and the second substrate 220 is filled with a liquid crystal layer 230 to complete the method for manufacturing the LCD panel 200. In one embodiment, the method for filling the space between the first substrate 210 and the second substrate 220 with the liquid crystal layer 230 is a conventional one drop fill (ODF) process or a vacuum stuffing process.

Referring to FIG. 3A or 3B, said ODF process is illustrated as followings. First, a sealant is formed on the first substrate 210 or the second substrate 220, wherein a material of the sealant is such as a heat curing resin or ultraviolet curing resin. Then a plurality of liquid crystals are dropped in an area surrounded by the sealant. Next, assembling the first substrate 210 and the second substrate 220, wherein the photo spacers 260a and 260b are wedged in the patterned openings 270a and 270b respectively. Afterwards, the sealant is cured so that the two substrates 210 and 220 are adhered to each other.

Additionally, said vacuum stuffing process is illustrated as followings. First, the first substrate 210 and the second substrate 220 are connected via a sealant, wherein an opening (not shown) is formed on the sealant. Next, a space between the first substrate 210 and the second substrate 220 is drawn to vacuum through the opening. Then disposing the opening of the sealant in a liquid crystal container (not shown), wherein the liquid crystal container is under normal atmospheric pressure. Afterwards, because the outside atmospheric pressure is higher than the pressure within a space between the first substrate 210 and the second substrate 220, the liquid crystals are forced to enter a space among the first substrate 210, the second substrate 220 and the sealant due to the pressure difference. Finally, sealing the opening of the sealant after space among the first substrate 210, the second substrate 220 and the sealant is full of the liquid crystals.

The method for manufacturing the LCD panel further comprises a step of forming a color filter array layer 280 (shown in FIGS. 2, 3A or 3B) on the first substrate 210 (not shown) or the second substrate 220. The method for forming the color filter array layer 280 is such as a printing method or an inkjet method. When the color filter array layer 280 is formed on the second substrate 220, the second substrate 220 is a color filter substrate (CF substrate) and the first substrate 210 is a thin film transistor substrate (TFT substrate). When the color filter array layer 280 is formed on the first substrate 210 (not shown), the first substrate 210 is a color filter on array (COA) substrate and the second substrate 220 is a glass substrate having common electrodes (not shown).

To sum up, the present invention, the LCD panel and manufacturing process thereof, has the following advantages:

(1) The cell gap between the first substrate and the second substrate can be kept by utilizing the design that the photo spacers wedged in the patterned openings. So the adverse effect, the outside gas enter the space between the two substrates and the gas bubbles are generated due to the lowered atmospheric pressure, will be reduced.

(2) Only little displacement of the two substrates may occur if the LCD panel is pressed with fingers because the photo spacers are wedged in the patterned openings. So the light leakage of the LCD panel will be reduced due to pressing with fingers.

(3) In the manufacturing process of the LCD panel of the present invention, because the patterned openings can be formed in the scan lines or the data lines at the same time while the scan lines and the data lines are defined by the etching process, the steps for manufacturing the LCD panel in the present invention will not be increased.

The above description provides a full and complete description of the embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A liquid crystal display panel, comprising:
 a first substrate, having a plurality of scan lines, data lines and thin film transistors are disposed on the first substrate, the thin film transistors being driven by the scan lines and the data lines, at least one of the scan lines and the data lines having a plurality of patterned openings with a first necking portion, wherein each of the scan lines and each of the data lines comprise:
- a first conductive layer, having a first opening;
- a second conductive layer, disposed on the first conductive layer, wherein the second conductive layer has a second opening, and the second opening is smaller than the first opening; and
- a third conductive layer, disposed on the second conductive layer, wherein the third conductive layer has a third opening, the third opening is larger than the second opening, and each of the patterned openings comprises the first opening, the second opening and the third opening;
- a second substrate, disposed above the first substrate, wherein a plurality of photo spacers with a second necking portion are disposed on the second substrate and the photo spacers with the second necking portion are wedged in the patterned openings with the first necking portion; and
- a liquid crystal layer, disposed between the first substrate and the second substrate.

2. The liquid crystal display panel of claim 1, wherein the scan lines and the data lines have the patterned openings, and the heights of the photo spacers wedged in the patterned openings of the scan lines are different from the heights of the photo spacers wedged in the patterned openings of the data lines.

3. The liquid crystal display panel of claim 1, wherein a size of an upper portion of the second opening is larger than a size of a lower portion of the second opening.

4. The liquid crystal display panel of claim 1, wherein an etching rate of the first conductive layer and the third conductive layer is larger than an etching rate of the second conductive layer.

5. The liquid crystal display panel of claim 4, wherein a material of the first conductive layer and the third conductive layer comprises Al.

6. The liquid crystal display panel of claim 4, wherein a material of the second conductive layer comprises Ti.

7. The liquid crystal display panel of claim 1, wherein each of the photo spacers comprises a top portion and a body, and a size of the top portion is larger than a size of the body.

8. The liquid crystal display panel of claim 1, further comprising a color filter array layer, disposed on the first substrate or on the second substrate.

9. The liquid crystal display panel of claim 1, wherein the first substrate comprises an active device matrix substrate.

10. The liquid crystal display panel of claim 1, wherein the second substrate comprises a color filter substrate.

11. A process for manufacturing a liquid crystal display panel, comprising:
- providing a first substrate, wherein a plurality of scan lines, data lines and thin film transistors are formed on the first substrate, the thin film transistors are driven by the scan lines and the data lines, and a plurality of patterned openings with a first necking portion are formed in at least one of the scan lines and the data lines, a process for forming the scan lines or the data lines comprising:
  - forming a first conductive layer, a second conductive layer and a third conductive layer over the first substrate sequentially;
  - forming a patterned photo-resist layer on the third conductive layer; and etching the third conductive layer, the second conductive layer and the first conductive layer sequentially to define the scan lines or the data lines, in a meantime, a first opening being formed in the first conductive layer, a second opening being formed in the second conductive layer, a third opening being formed in the third conductive layer, wherein the second opening is smaller than the first opening and the third opening, and each of the patterned openings comprises the first opening, the second opening and the third opening;
- providing a second substrate, disposed above the first substrate, wherein a plurality of photo spacers with a second necking portion are disposed on the second substrate; and
- assembling the first substrate and the second substrate, wherein the photo spacers with the second necking portion are wedged in the patterned openings with the first necking portion, and a liquid crystal layer is disposed between the first substrate and the second substrate.

12. The process for manufacturing a liquid crystal display panel of claim 11, wherein a size of an upper potion of the second opening is larger than a size of a lower portion of the second opening.

13. The process for manufacturing a liquid crystal display panel of claim 11, wherein an etching rate of the first conductive layer and the third conductive layer is larger than an etching rate of the second conductive layer.

14. The process for manufacturing a liquid crystal display panel of claim 13, wherein a material of the first conductive layer and the third conductive layer comprises Al.

15. The process for manufacturing a liquid crystal display panel of claim 13, wherein a material of the second conductive layer comprises Ti.

16. The process for manufacturing a liquid crystal display panel of claim 13, wherein each of the photo spacers comprises a top portion and a body, and a size of the top portion is larger than a size of the body.

17. The process for manufacturing a liquid crystal display panel of claim 13, further comprising a step of forming a color filter array layer on the first substrate or on the second substrate.

* * * * *